OPTICAL SCANNER

Filed May 7, 1962

2 Sheets-Sheet 1

INVENTOR.
ROBERT C. TRESEDER
PETER BETTS
BY John L. Jackson
ATTORNEY

Feb. 15, 1966 R. C. TRESEDER ET AL 3,235,660

OPTICAL SCANNER

Filed May 7, 1962

2 Sheets-Sheet 2

3,235,660
Patented Feb. 15, 1966

3,235,660

OPTICAL SCANNER

Robert C. Treseder and Peter Betts, San Jose, Calif., assignors to International Business Machines Corporation, New York, N.Y., a corporation of New York Filed May 7, 1962, Ser. No. 201,225
3 Claims. (Cl. 178—7.6)

This invention relates to optical-to-electrical converting devices in general and more particularly to an optical scanning system for scanning a document and generating an electrical signal indicative of the print content thereof.

Optical scanners capable of scanning a document and generating an electrical output indicative of the print content of the docudment have been used for many years. For example, one well known type of optical scanner is used in facsimile type applications. In the facsimile type system the document to be scanned is placed on a rotatable drum and scanned by means of a light spot-photomultiplier arrangement. Traditionally, these facsimile type scanners have yielded poor resolution output due to the decreased signal-to-noise ratio which results from the high drum rotational speeds which must be maintained to provide practical document processing times. Also, the total time required for scanning a document is relatively high since not only must the document be physically placed around and attached to the drum, but, additionally, the movement of the photocell device along the drum during scanning is relatively slow.

With recent advances in information retrieval technology, another application has arisen wherein a device is needed which is capable of scanning a document and providing an electrical signal indicative of the print content of the document which signal can be transmitted to a remote location for subsequent reconstruction. The time consuming and cumbersome facsimile processes available today are not amenable to information retrieval applications since it is quite likely that in large information retrieval systems tens of thousands of documents must be processed per day. Additionally, since the source document or document to be scanned in an information retrieval store may have relatively poor resolution, transmission of such poor resolution documents by means of conventional facsimile systems would often produce unusable reproductions at the remote location.

Thus, in information retrieval type applications an optical scanner must be capable of relatively high speed document processing in the order, for example, of one document each two seconds inclusive of both loading and scanning times. Additionally, the electrical output signal from such a scanner should preferably be in parallel rather than in serial form as in most known systems to allow use of relatively narrow band width amplifying systems to provide good signal-to-noise ratios. Moreover, the resolution of such a high speed parallel output scanner should be many times better than the resolution obtained through use of present day optical scanning systems.

Another application in which presently available scanning systems have been found to be inadequate is in the relatively new field of character recognition and sensing. In most currently available scanners many scans are required before a character can be identified since only a portion of the character is sensed per scan. Thus, if a line of characters is to be scanned and identified, a large buffer must be provided for storing the information generated during each scan until the last scan is made at which time the character recognition sequence can be initiated. The result is not only that the character recognition sequence must be delayed, but, additionally, large, expensive buffers and information reconstruction means must be provided.

The buffer problem in present day scanners used in character recognition systems is alleviated somewhat by use of a "sub-raster" scan technique in which, as a scanning device is moved across the area to be scanned, it is oscillated so that it "views" a complete character. Problems attendant to use of this type of system are that if the system is mechanical, it tends to fly apart because of the high scanning velocities required and if a flying spot scanning system is used, poor resolution results. Moreover, whether a mechanical or electronic scanner is used to produce the sub-raster scan, the signal-to-noise ratio of the system will be quite low since the band width of the associated circuitry must be quite wide to accommodate the extremely high frequency signal which results from the sub-raster scan.

Thus, in character sensing applications, a need exists for a scanning system which is capable of generating a relatively low frequency electrical signal indicative of a line of characters to allow good signal-to-noise ratios. Additionally, the system must generate the indicative electrical signal in one scan of the document to negate the requirement for large buffers and information reconstruction systems.

It is, therefore, an object of the present invention to provide a novel high speed optical scanning system.

Another object of the present invention is to provide a high speed optical scanning system capable of providing extremely high resolution scans.

Another object of the present invention is to provide a high speed optical scanner having a parallel output which is relatively low in frequency to provide good signal-to-ratio ratios.

Another object of the present invention is to provide a high speed optical scanner which is mechanically simple, highly reliable and relatively inexpensive.

Another object of the present invention is to provide an optical scanning system which is capable of generating an electrical signal indicative of a print character with only one scan.

The foregoing and other objects, features and advantages of the invention will be apparent from the following more particular description of preferred embodiments of the invention, as illustrated in the accompanying drawings in which.

Briefly, a document to be scanned is placed on a feed table and fed into an arcuate document guide by a rotating optical support member. The rotating optical support member has at least one optical scanning device mounted thereon and, in the preferred embodiment, has six optical scanning devices mounted thereon to provide six optical scans per revolution. The light output of the optical scanning devices is fed into an optical-to-electrical converter such as a photomultiplier to produce an electrical output indicative of the print content of the document being scanned as it passes the rotating optical support member.

Figure 1:
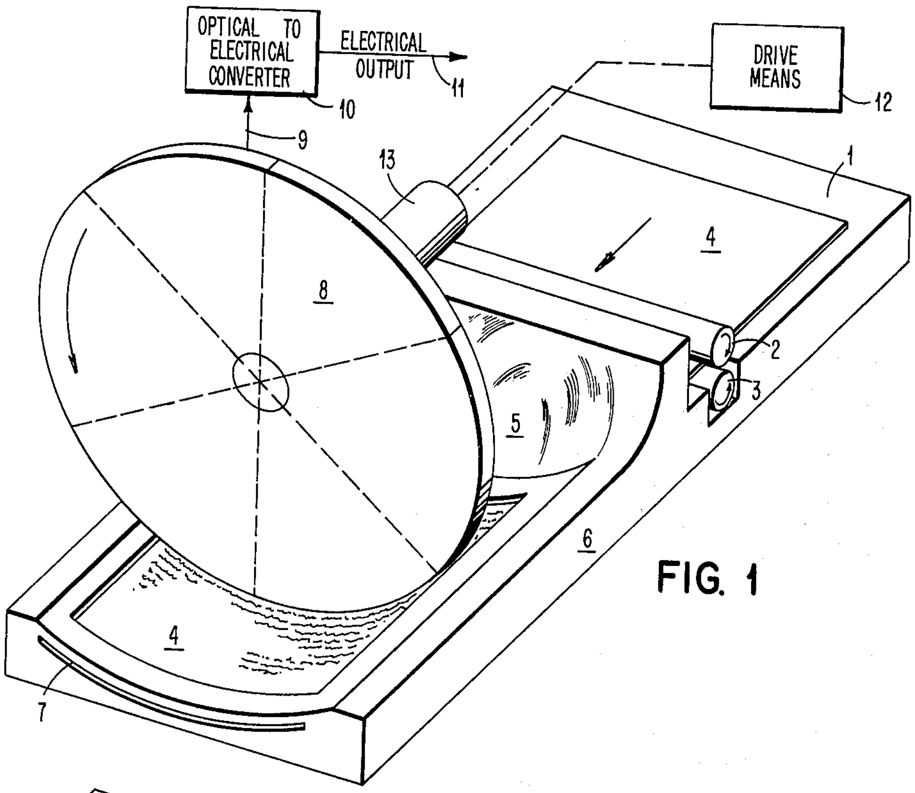
FIG. 1 is a generic isometric view illustrative of the optical scanning system and method employed in the subject invention.

For a more detailed description, refer first to FIG. 1 wherein is shown a table or bed 1 having feed rollers 2 and 3 for feeding a document 4 into a curving portion 5 and thence into the arcuate document guide 6. Not shown in FIG. 1 are additional feed rollers or mechanisms which feed the documents to be scanned completely through the document guide and out through the exit slit 7. From a consideration of FIG. 1 it can be seen that when a document 4 is fed into rollers 2 and 3, it is caused to take a curved shape in the curver 5 for entrance into the document guide 6. The passage of a document 4 through the document guide 6 will be parallel to the axis of rotation of the rotatable optical support member 8. Additionally, the arc formed by the document as it passes through the document guide 6 is concentric with the arc subscribed by the optical scanning devices (not shown) as the rotatable optical support member 8 rotates.

The optical support member 8 is caused to rotate by means of shaft 13 and drive means 12. Suitable bearing members are provided for rotatably supporting shaft 13 to enable rotation of the rotatable member 8.

Contained within each of the six 60° optical scanning sections defined by the dotted lines shown on the rotatable member 8 is an optical scanning device such as a lens system which provides an optical output along optical line 9 to the optical-to-electrical converter 10. The optical output of the rotatable optical scanning member 8 is converted in the optical-to-electrical converter 10 into an electrical signal indicative of the optical output of the rotatable optical scanning member 8 as it scans the document 4.

Figure 2:
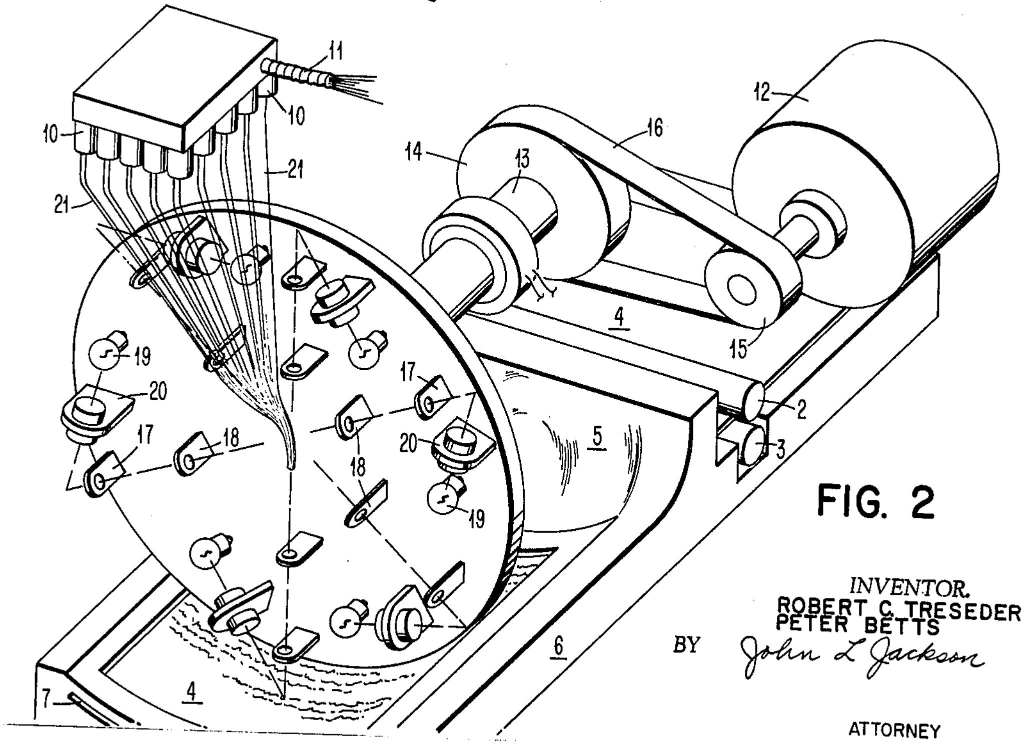
FIG. 2 is an isometric view of the preferred embodiment of the subject invention employing a plurality of optical systems mounted on a rotatable optical support member which are in optical association with a light fiber optical-to-electrical converter arrangement.

Refer next to FIG. 2 wherein is shown the preferred embodiment of the subject invention. In FIG. 2 as in FIG. 1 is shown the document guide and transport mechanism 6 through which a document 4 to be scanned is caused to move past a rotatable optical support member 8. Rotation is imparted to the shaft 13 upon which the optical support member 8 is mounted by means of pulleys 14 and 15, belt 16 and motor or drive means 12.

The rotatable optical support member 8 of FIG. 2 is divided into six optical scanning sections. The six optical scanning sections are defined by the optical axis of the six groups of objective lenses 17 and 18 which are mounted on the rotatable optical support member 8. Associated with each of the pairs of objective lenses 17 and 18 are a ribbon filament lamp 19 and a condenser lens 20 which are also mounted on the support member 8. The condenser lens 20 condenses the light output of the lamp 19 and directs it to a point on the document to be scanned which point of light lies on the optical axis of the associated objective lens pair 17 and 18. Also lying on the optical axis of the objective lens pair 17 and 18 which are in scanning association with the document 4 and at susbtantially the center of the member 8, are the ends of a plurality of light conductors 21 which may, for instance, be light fibers. Connected to each of the plurality of light fibers 21 is an associated photomultiplier 10.

In operation the document 4 to be scanned is caused to move past the rotatable optical support member 8 by the document feed mechanism as described with respect to FIG. 1. During the passage of the document 4 past the optical support member 8, it is curved by the document guide 6 such that as each light-lens system moves across the document, the area of the document focused on the light fiber ends is equal. Additionally, each lamp, condenser lens and objective lens group is substantially identical such that the size of and intensity of the scanning light spots are substantially equal. Assuming clockwise rotation of the optical support member 8, a point of light will move across the document 4 from right to left in a scan which is substantially parallel to the lines of print. As the point of light moves across the document, it is modulated by the print content of the document to provide a light modulated output which is focused by means of the objective lenses 17 and 18 onto the ends of the group of light fibers 21. The light fibers 21 will accept light over an angle of 60° and will therefore accommodate a full page width scan. Since each of the light fibers 21 at any instant of time will see a portion of the document which at that instant lies on the optical axis of the objective lens system 17 and 18, the instantaneous output of each photocell 10 will be indicative of the print content seen by its associated light fiber. In this manner, as the rotatable optical scanning member 8 scans the document 4, the photocells 10 will produce an electrical output indicative of the print content of the portion of the document scanned. The electrical analog output of each of the photomultipliers 10 can be taken in parallel or can be commutated or sampled to provide a serial output.

To provide high resolution as well as a signal representative of a character by means of only one scan the point of light condensed onto the document is made slightly larger than any character on the document to be scanned which facilitates initiation of a character recognition sequence only when the character to be sampled lies totally in the instantaneous area scan. This can be accomplished, for instance, by sampling the light output of the end light fibers of the row, which, if the character to be sampled lies wholly in the instantaneous scan, will have a maximum light output unmodulated by print since the ends of the light fibers 21 are arranged in a single closely spaced row substantially parallel to the axis of rotation of the optical support member 8. The row of light fibers should, of course, be long enough to accommodate the point of light imaged by the objective lenses 17 and 18 so that a whole character can be sensed.

In practice it has been found that a system constructed in accordance with the herein described invention which employs a bundle of 25 light fibers and six optical scanning sections rotated at 600 r.p.m. will resolve a 2 mil dot at document feed rates of ten lineal inches per second.

Figures 3, 4, 5, 6:
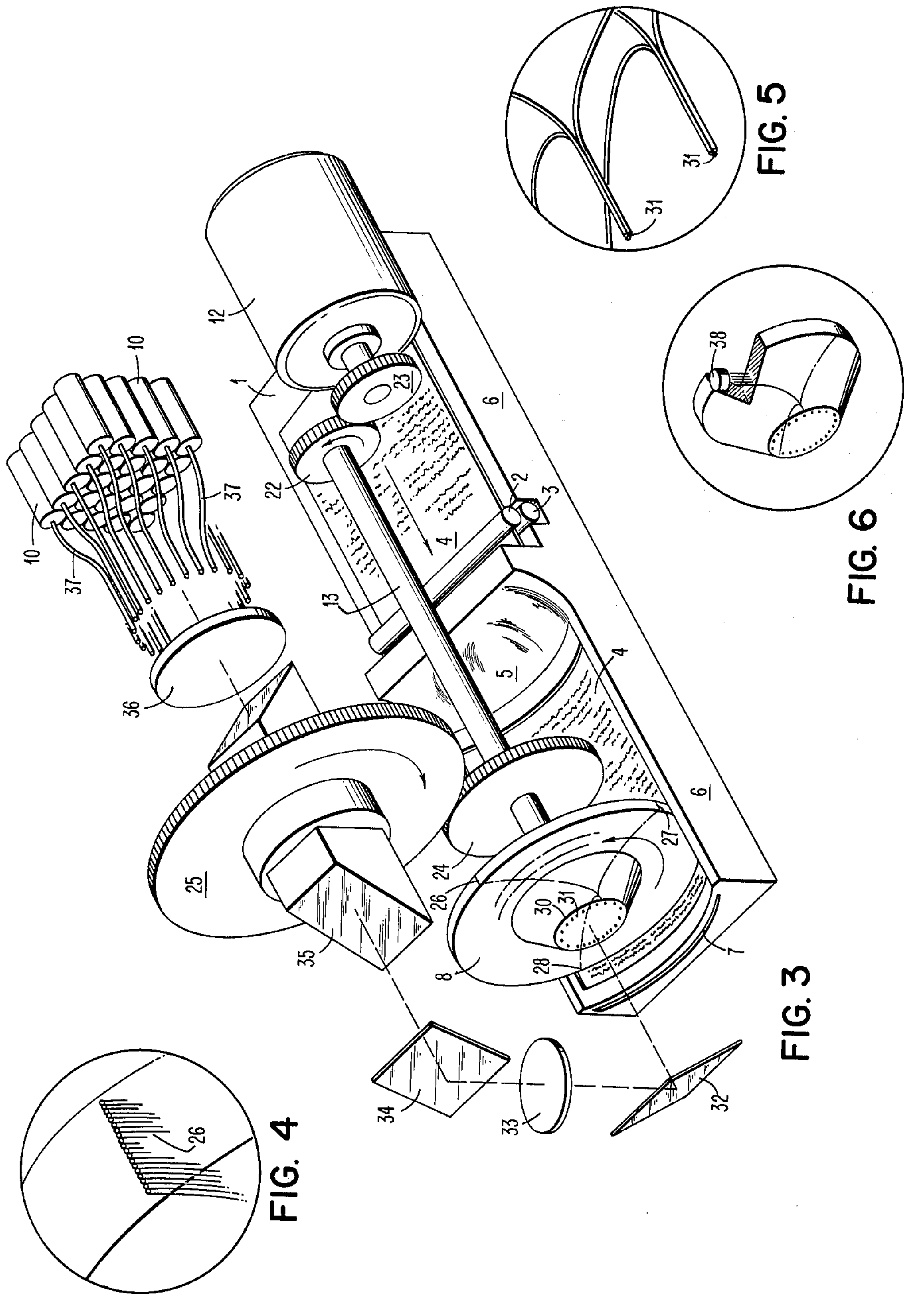
FIG. 3 is an alernate embodiment of the subject invention employing a light fiber scanning system on a rotatable optical support member in optical association with a rotatable dove prism for imaging the optical output of the light fibers onto an associated optical-to-electrical converter.
FIG. 4 is a blowup of the light fiber scanning arrangement of the embodiment of FIG. 3.
FIG. 5 is a blowup of the light fiber summing method employed in the embodiment of FIG. 3.
FIG. 6 shows a possible modification of the rotatable optical support member of FIG. 3 in which a lens is utilized to image the scanned portion of the document onto the light fibers.

Refer next to FIG. 3 wherein is shown another embodiment of the subject invention. The document transport device 6 is identical in operation to that of FIG. 1. Rotation to shaft 13 to which is attached the rotatable optical support member 8 is imparted by means of gears 22 and 23 and drive means 12. A gear 24 is fixedly attached to shaft 13 and drives gear 25 at a 1:2 ratio.

Three groups of light fibers 26, 27 and 28 terminate with their ends on the periphery of disk 8. As better shown in FIG. 4, each of the groups of light fibers are closely arranged in a row which is parallel to the axis of rotation of the optical support member 8. Corresponding ones of the three groups of light fibers are brought together with their ends forming one of the output points 31 of a circular array of output points on an output disk 30. There will be as many output points 31 on the output disk 30 as there are light fibers in each of the groups 26, 27 and 28. The output points are preferably equally spaced and lie on a circle having its center on the axis of rotation of the optical support member 8. In FIG. 5 is shown the method of forming the output point 31 by bringing together corresponding light fibers from each of the three groups.

A mirror 32 is placed on the axis of rotation of the disk 8 and tilted such that an image of the output disk 30 is reflected onto a lens 33 which is used to focus the image of the output disk 30 onto a second mirror 34. The second mirror 34 is tilted such that the rotational center of the image of the output disk 30 falls on the axis of rotation of one face of a dove prism 35 which is mounted through disk 25. Lens 36 has its optical axis on the axis of rotation of the dove prism 35 and is used to image the other face of the dove prism 35 onto a plurality of glass fibers arranged in a circular configuration with its center on the optical axis of the lens 36. The glass fibers 37 are separated by the same relative amount as the output points 31 on output disk 30. Each of the light fibers 37 is connected to an associated photomultiplier 10.

In operation shaft 13 is caused to rotate by means of the gears 22 and 23 and motor 12. Rotation of shaft 13 causes gear 24 and rotatable optical support member 8 to rotate at twice the velocity of gear 25 through which is mounted the dove prism 35. Assuming a clockwise rotation of rotatable scanning member 8, the lines of light fibers 26, 27 and 28 mounted in the periphery of the disk 8 will scan the lines on the page from right to left. Each of the light fibers will see a particular portion of the document which is at that instant being scanned. As the disk rotates, a modulated light output signal will be transmitted by means of the light fibers to the output points 31 on the output disk 30. The instantaneous view of the rows of light fibers is converted into a circular array of output points 31 which is reflected by means of mirrors 32 and 34 to the face of the dove prism 35. Since the dove prism 35 is rotating at one-half the rotational velocity of the output disk 30 due to the dove prism phenomena, the image of the output disk 30 received by the lens 36 is stationary. Thus, each of the light fibers 37 is associated with a particular one of the output points 31 and therefore associated with a particular one of the line of light fibers. As explained in conjunction with the description of FIG. 2, the electrical output of the photomultipliers 10 may be either taken in parallel or commutated to provide serial output.

A method of modifying the rotatable optical scanning member 8 of FIG. 3 to provide higher resolution is shown in FIG. 6. A lens 38 is provided in optical alignment with each of the rows 26, 27 and 28 of light fiber ends to image the document onto the light fibers.

As described with respect to FIG. 2, in many character recognition applications the rows of light fibers 26, 27 and 28 should be made slightly longer than the height of the characters to be scanned to allow single sweep scanning.

It is, of course, obvious that the embodiment of FIG. 3 could be modified by putting the dove prism 35 in alignment with the output disk 30 in which case mirrors 32 and 34 and lens 33 would not be required. Likewise, in either embodiment the number of light conductors as well as the number of scanning sections could be modified in accordance with demands of the particular application.

In the above described manner, there has been provided a high speed scanning system which utilizes a novel document loading and scanning technique to provide relatively high speed document processing. Additionally, the optical scanning system herein described provides an extremely high resolution output due to the fact that a "brush" scan is employed which yields a parallel electrical output which can be handled in relatively narrow band amplifying systems. The herein described scanning system also utilizes a single sweep scan to generate a relatively low frequency electrical signal indicative of the scanned characters which provides good signal to noise ratios and allows its use in character sensing applications without need of a large associated buffer and/or character reconstruction device.

While the invention has been particularly shown and described with reference to preferred embodiments thereof, it will be understood by those skilled in the art that various changes in the form and details may be made therein without departing from the spirit and scope of the invention.

What is claimed is:

1. A system for converting the print content of a document to an electrical signal comprising:
- a rotatable optical support member,
- means for rotating said rotatable optical support member,
- at least one optical scanning device mounted on said rotatable optical support member comprising a light conductor having one end terminating at the periphery of said rotatable optical support member and the other end terminating near the center of said rotatable optical support member,
- means for passing said document past said rotatable optical support member substantially arcuate to the periphery of said rotatable optical support member,
- an optical to electrical converting means for each of said optical scanning devices spaced from said rotatable optical support member, and
- means for optically connecting each of said optical scanning devices to its associated optical to electrical converting means.

2. A system for converting the print content of a document to an electrical signal comprising:
- a rotatable optical support member,
- means for rotating said rotatable optical support member,
- at least one optical scanning device mounted on said rotatable optical support member comprising a plurality of light conductors having one of their ends terminating at the periphery of said rotatable optical support member closely arranged in a row substantially parallel to the axis of rotation of said rotatable optical support member and the other ends thereof arranged in a circular configuration about the axis of rotation of said rotatable optical support member,
- means for passing said document past said rotatable optical support member substantially arcuate to the periphery of said rotatable optical support member,
- one optical to electrical converting means for each of said plurality of light conductors, and
- optical means for imaging said circular configuration of light conductor ends onto an associated optical to electrical converting means.

3. The system of claim 2 wherein said optical means comprises a dove prism which is rotated at one-half the speed of said rotatable optical support member and which has its axis of rotation substantially parallel to the axis of rotation of said rotatable optical support member.

References Cited by the Examiner

UNITED STATES PATENTS

| | | | |
|---|---|---|---|
| 2,800,527 | 7/1957 | Artzt | 178—7.11 |
| 2,939,362 | 6/1960 | Cole | 178—7.6 X |
| 3,036,153 | 5/1962 | Day | 178—6 |
| 3,100,242 | 8/1963 | Herbert | 178—7.6 X |

OTHER REFERENCES

Krolak, L. J. et al.: "Fiber Optics–A New Tool in Electronics," in Journal of the Society of Motion Picture and Television Engineers, 69 (10), p. 706, October 1960.

DAVID G. REDINBAUGH, *Primary Examiner.*